United States Patent [19]

Nakamura

[11] Patent Number: 6,102,821
[45] Date of Patent: *Aug. 15, 2000

[54] MULTIPLE SPROCKET ASSEMBLY FOR A BICYCLE

[75] Inventor: Yasushi Nakamura, Itami, Japan

[73] Assignee: Shimano, Inc., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/711,399

[22] Filed: Sep. 6, 1996

[30] Foreign Application Priority Data

Sep. 29, 1995 [JP] Japan ................................. 7-252201

[51] Int. Cl.[7] .................................................. F16H 55/12
[52] U.S. Cl. ......................................... 474/160; 474/164
[58] Field of Search .............................. 474/77, 78, 158, 474/160; 74/594.2; 192/64; 280/238

[56] References Cited

U.S. PATENT DOCUMENTS

| | | | |
|---|---|---|---|
| 3,919,898 | 11/1975 | Sugino | 74/594.2 |
| 4,150,859 | 4/1979 | Segawa et al. | |
| 4,348,200 | 9/1982 | Terada | 474/160 |
| 4,790,554 | 12/1988 | Siegwart, Jr. | 474/78 X |
| 4,869,710 | 9/1989 | Iwasaki | 474/160 |
| 4,889,521 | 12/1989 | Nagano | 474/164 |
| 5,194,051 | 3/1993 | Nagano | 474/160 |
| 5,246,402 | 9/1993 | Romano | 474/160 X |
| 5,503,600 | 4/1996 | Berecz | 474/160 |
| 5,545,096 | 8/1996 | Su | 474/160 |

FOREIGN PATENT DOCUMENTS

| | | |
|---|---|---|
| 0193178 | 6/1986 | European Pat. Off. . |
| 0431573 A1 | 6/1991 | European Pat. Off. . |
| 1013843 | 5/1952 | France ................................. 474/160 |
| 2467135 | 4/1981 | France . |
| 2-47119 | 1/1988 | Japan ................................. B62M 9/10 |
| 4-297390 | 10/1992 | Japan . |
| 6721800 | 5/1978 | Taiwan . |
| 80210960 | of 1992 | Taiwan . |

OTHER PUBLICATIONS

Shimano Bicycle Systems Components, vol. 1, No. 2, p. 90, dated Mar. 1983.

*Primary Examiner*—Thomas R. Hannon
*Attorney, Agent, or Firm*—James A. Deland

[57] ABSTRACT

A multiple sprocket assembly includes one or more sprocket subassemblies. Each sprocket subassembly includes a spider-type sprocket support which supports first and second sprockets. The sprocket support includes a boss and a plurality of supporting arms extending radially outward from the boss. Each supporting arm includes a first mounting surface and a second mounting surface opposite the first mounting surface in an end region of the supporting arm. The first sprocket is mounted to the first mounting surface of each supporting arm, and the second sprocket is mounted to the second mounting surface of each supporting arm. A difference between a number of teeth on the first sprocket and a number of teeth on the second sprocket is small, e.g., from one to three teeth. A fastening means in the form of an attachment pin which extends through a first sprocket opening in the first sprocket, a second sprocket opening in the second sprocket, and an attachment opening in a corresponding supporting arm fastens the first sprocket and the second sprocket to the respective first mounting surface and second mounting surface. One or more third sprockets may be disposed in a row with the first sprocket and the second sprocket.

41 Claims, 9 Drawing Sheets

MULTIPLE SPROCKET ASSEMBLY FOR A BICYCLE

BACKGROUND OF THE INVENTION

The present invention is directed to multiple sprocket assemblies for bicycles.

In recent years, as the number of speeds available in bicycle transmissions has increased, the number of sprocket wheels installed on the rear-wheel sprocket assembly of such bicycles has increased to 5 or 7 sprocket wheels or more. As a result, there has been a demand for simplification of the attachment structure and facilitation of the attachment method used in such cases. For example, in the rear-wheel multiple sprocket assembly described in Japanese Utility Model Application Kokai No. 63-4893, the demand is satisfied by a structure in which a plurality of sprocket wheels formed as annular plates are fit over the outer circumferential surface of a cylindrical boss member with spacers interposed between each sprocket wheel. The mutual connection of the respective sprocket wheels and spacers is accomplished by means of screws, etc, and splines are formed between the sprocket wheels and the boss member in order to prevent relative rotation between the components.

In order to reduce the weight of any multiple sprocket assembly, it is desirable to reduce the volume of the sprocket wheels. However, in the above structure the distance from the teeth of the sprocket wheel with the largest external diameter to the boss engaging portion of the sprocket wheel is fairly large, so the sprocket wheel must have a sufficient thickness in order to avoid deformation when torque is transmitted. Thus, since the sprockets in the above type of assembly must be made thicker to avoid deformation when torque is transmitted, an increase in weight is unavoidable.

In order to solve the problems encountered in the these conventional sprocket wheel units, an improved multiple sprocket assembly is disclosed in JP 4-297390. This multiple sprocket assembly comprises a spider (sprocket support) which supports a plurality of ring-shaped sprocket wheels. A light metal such as aluminum, etc., is generally used for the spider, while various types of steel materials are used for the sprocket wheels to provide adequate strength. The spider comprises [I] a boss part and [ii] a plurality of supporting arms which extend radially outward from the outer circumferential surfaces of the boss part in directions perpendicular to the axis of the boss part. The sprocket wheels are attached to mounting surfaces formed as steps in the radial direction on one side surface of each of the supporting arms. In this construction, the ring shapes of the respective sprocket wheels are set so that the sprocket wheels have a short radial width just sufficient to allow the formation of teeth and attachment holes. Accordingly, this construction is greatly improved in terms of weight reduction. However, a drawback of a multiple sprocket assembly unit constructed in this manner is that in cases where there is little difference in the respective numbers of teeth of adjacent sprocket wheels (so that there is no great difference in the diameters of the adjacent sprocket wheels), the attachment parts of one sprocket wheel overlap with the attachment parts of the other sprocket wheel in the radial direction. As a result, the radial widths of the two sprocket wheels must be increased in order to attach both sprocket wheels to the same supporting arms, so that the merit of weight reduction again is lost.

SUMMARY OF THE INVENTION

The present invention is directed to a lightweight multiple sprocket assembly for a bicycle which allows the use of a spider-type sprocket support with sprockets having small differences in the number of teeth between adjacent sprockets. In one embodiment of the present invention, a multiple sprocket assembly includes one or more sprocket subassemblies. Each sprocket subassembly includes a spider-type sprocket support which supports first and second sprockets. The sprocket support includes a boss and a plurality of supporting arms extending radially outward from the boss. Each supporting arm includes a first mounting surface and a second mounting surface opposite the first mounting surface in an end region of the supporting arm. The boss may include a first engaging means disposed on an inner peripheral surface thereof for engaging with a one-way clutch mechanism.

The first sprocket is mounted to the first mounting surface of each supporting arm, and the second sprocket is mounted to the second mounting surface of each supporting arm. A difference between a number of teeth on the first sprocket and a number of teeth on the second sprocket is small, e.g., from one to three teeth. In a more specific embodiment, a fastening means in the form of an attachment pin which extends through a first sprocket opening in the first sprocket, a second sprocket opening in the second sprocket, and an attachment opening in a corresponding supporting arm fastens the first sprocket and the second sprocket to the respective first mounting surface and second mounting surface.

One or more third sprockets may be disposed in a row with the first sprocket and the second sprocket, wherein each third sprocket has a second engaging means disposed on an inner peripheral surface thereof for engaging with the one-way clutch mechanism. If desired, a spacer may be disposed between adjacent third sprockets to set the appropriate distance between the sprockets. To set the appropriate distance between the second sprocket and the third sprocket immediately adjacent to it, the boss of the sprocket support, which is concentric with an axis (X), may include front and rear portions which extend in the direction of the axis (X). The front and rear portions also may be used to set the appropriate distance between the second sprocket of one sprocket subassembly and the first sprocket of an adjacent sprocket subassembly by aligning the front and rear portions of one sprocket subassembly with the front and rear portions of the adjacent sprocket subassembly.

DETAILED DESCRIPTION OF THE EMBODIMENTS

Figure 1:
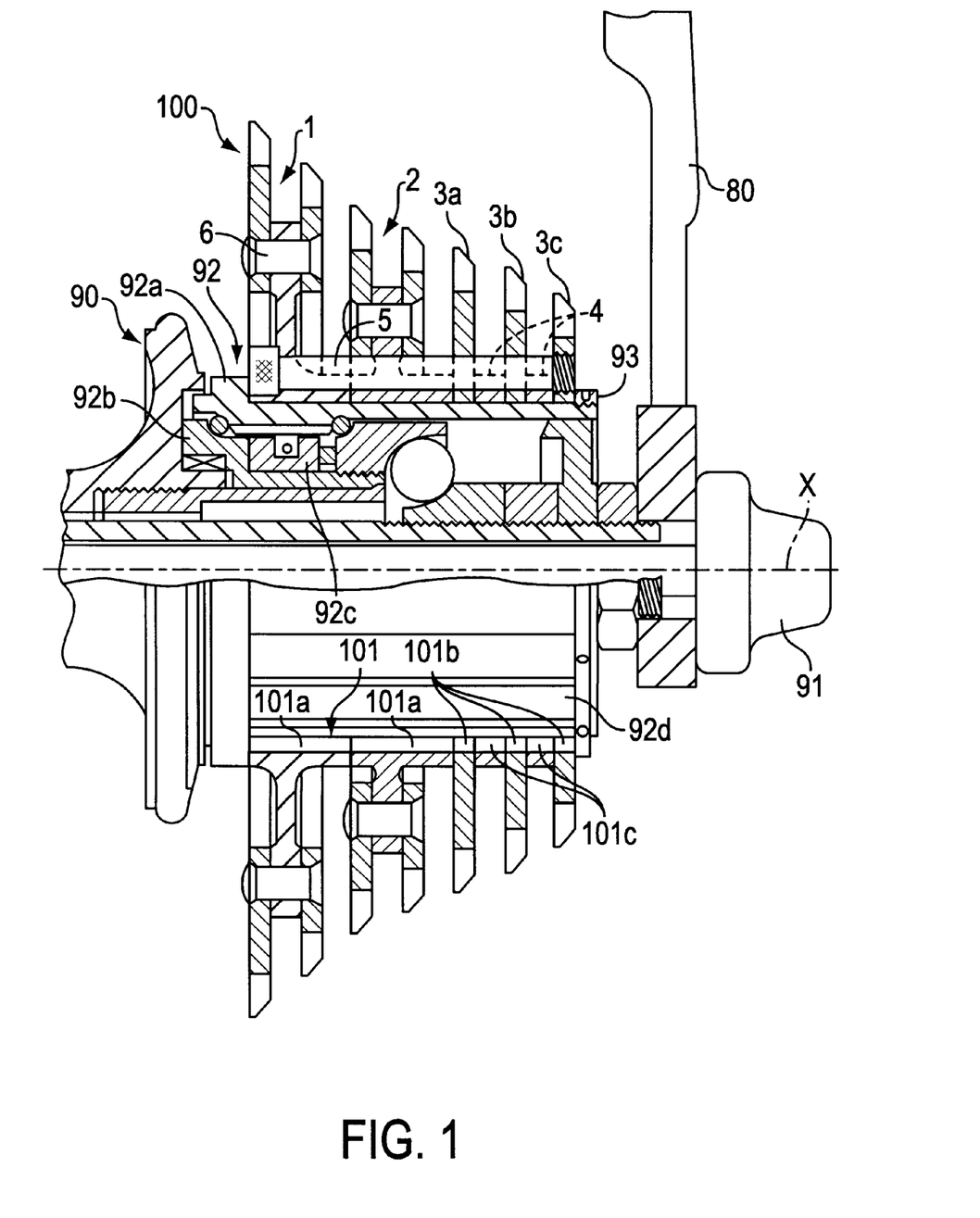
FIG. 1 is a cross-sectional view of a particular embodiment of a multiple sprocket assembly according to the present invention.

FIG. 1 shows a rear wheel hub assembly in the form of a free hub 90 which is fastened to a bicycle frame 80 through a quick-release mechanism 91. A one-way clutch mechanism 92 consisting of an outer race 92a, an inner race 92b and one-way pawls 92c is installed on one end of free hub 90. Engaging grooves or splines 92d which extend along the axis X of the rear axle are formed on the outer circumferential surface of the outer race 92a. A 7-speed multiple sprocket assembly 100 is mounted on the outer race 92a so that the multiple sprocket assembly 100 is fit into the engaging grooves 92d, and the movement of multiple sprocket assembly 100 in the axial direction is checked by means of a ring stopper 93. In order to prevent relative rotation between the multiple sprocket assembly 100 and the outer race 92a, engaging means 101 are formed on the inner circumferential surface of multiple sprocket assembly 100 so that the engaging means 101 face the engaging grooves 92d. These engaging means 101 will be described later. The multiple sprocket assembly 100 shown in FIG. 1 is constructed from two sprocket subassemblies, i.e., a first sprocket subassembly 1 and a second sprocket subassembly 2, three ring-shaped sprockets 3a, 3b and 3c which have different numbers of teeth, ring-shaped spacers 4 which are installed between the sprockets 3a,3b,3c, and connecting screws 5 which are passed through the components in order to form an integral unit.

Figure 2:
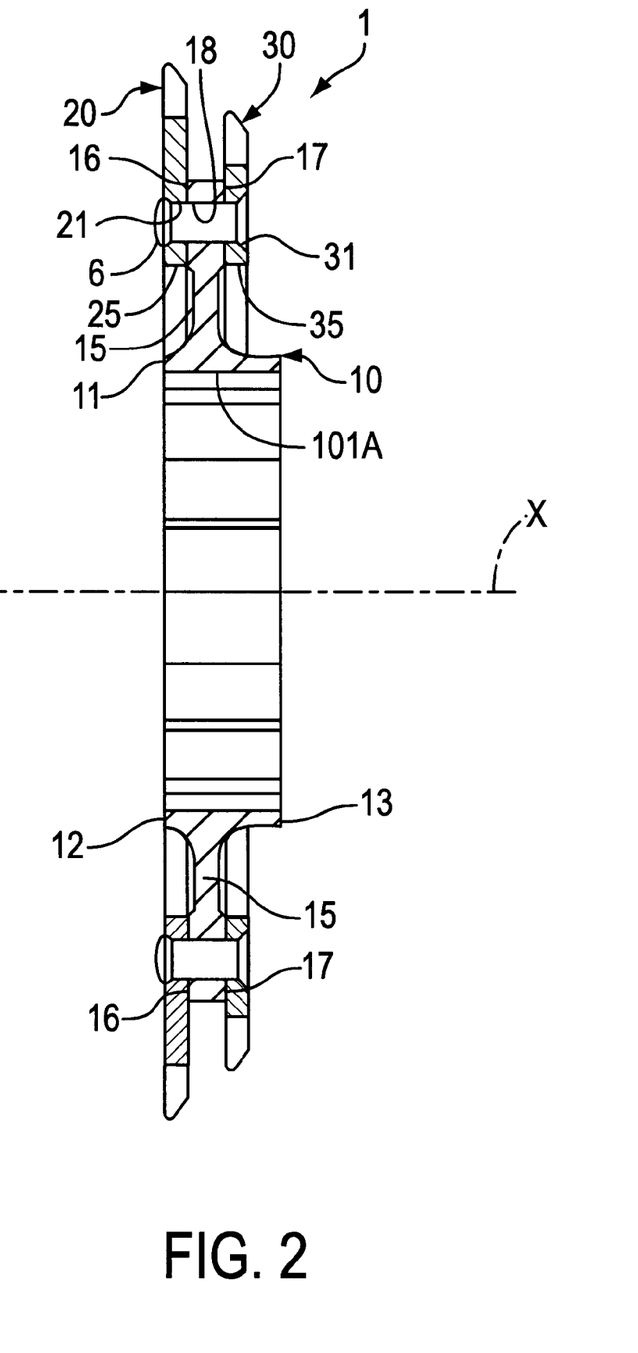
FIG. 2 is a cross sectional view of one of the sprocket subassemblies shown in FIG. 1.
Figure 3:
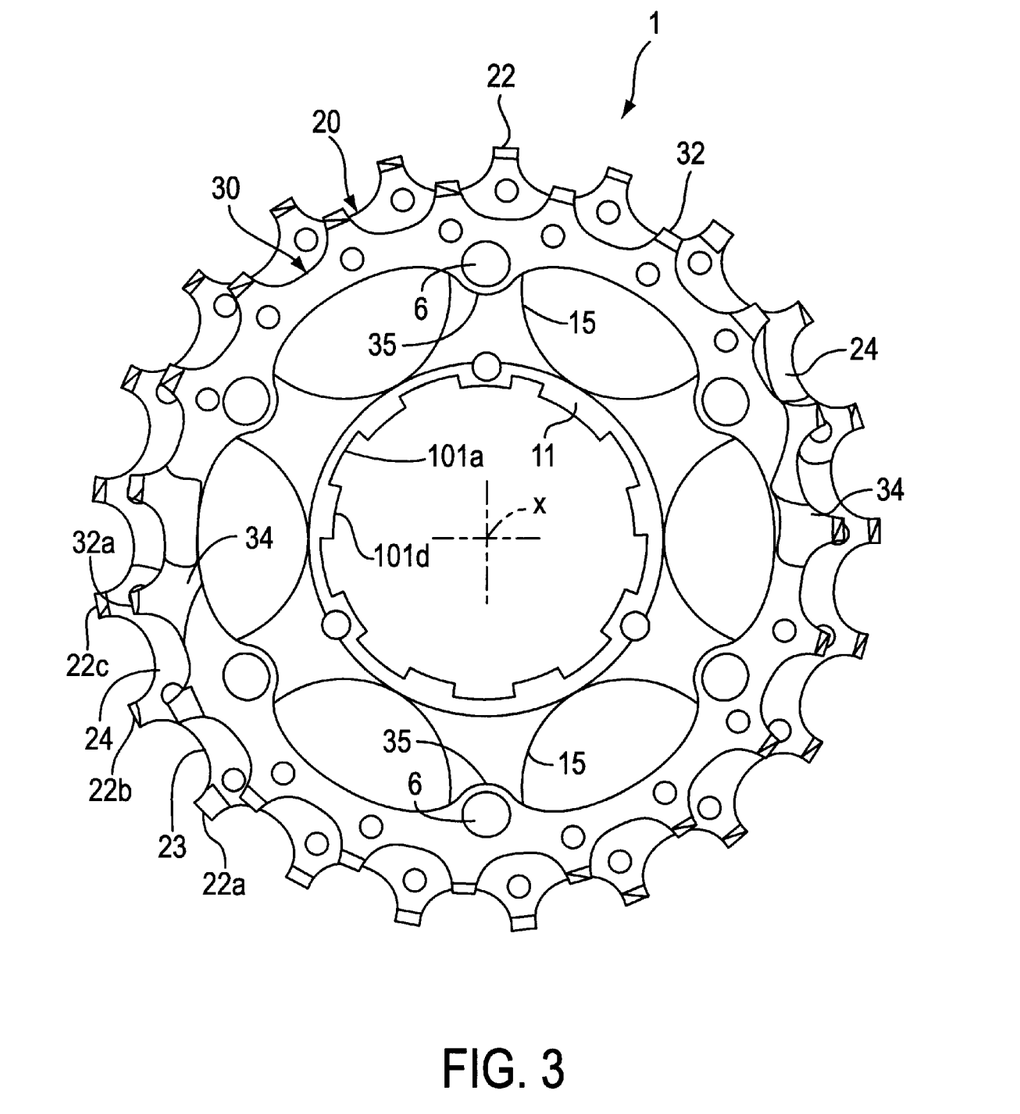
FIG. 3 is a front view of the sprocket subassembly shown in FIG. 2.

As is shown in FIGS. 2 and 3, the first sprocket subassembly 1 consists of a spider-type sprocket support 10 and first and second sprockets 20 and 30. Spider 10 is equipped with a boss part 11 which has an axis X, and six sprocket support members in the form of supporting arms 15 which extend radially outward from the outer circumferential surface of the boss part 11 in directions substantially perpendicular to the axis X. The first sprocket 20 and second sprocket 30 are attached to the spider 10. In this embodiment, the first sprocket 20 has 21 teeth, and the second sprocket 30 has 19 teeth, so that the difference in the number of teeth between the two sprocket wheels is 2 teeth. As a result, the external diameters of the two sprocket wheels are not very different.

First mounting surfaces 16 are formed in a radial direction (i.e., in directions substantially perpendicular to the axis X) on the tip regions of the respective supporting arms 15 for mounting the first sprocket 20, and second mounting surfaces 17 are formed in a radial direction (i.e., in directions substantially perpendicular to the axis X) on the tip regions of the respective supporting arms 15 for mounting the second sprocket 30. These first mounting surfaces 16 and second mounting surfaces 17 are formed opposite each other on the front and back surfaces of the supporting arms 15.

Attachment holes 18 which pass through the supporting arms 15 from the first mounting surfaces 16 to the second mounting surfaces 17 are formed parallel to the axis X. As shown in FIG. 3, tongue parts 35 which project toward the axis X are formed on the inner circumferential surface of the second sprocket 30 to minimize the radial width of the sprocket and thereby save weight, and through-holes 31 are formed through these tongue parts 35. Similarly, tongue parts 25 which project toward the axis X are also formed on the inner circumferential surface of the first sprocket 20, and through-holes 21 are formed in these tongue parts 21. Both sprockets are fastened to the mounting surfaces of the supporting arms 15 in a prescribed positional relationship by means of rivet pins 6 which are passed through the through-holes 21 and 31 and the attachment holes 18 of the supporting arms 15. This prescribed positional relationship of the two sprocket wheels will be described with reference to FIGS. 3, 6 and 7.

As shown in FIG. 3, the relative positions of the respective tooth parts 22 and 32 of the first sprocket 20 and second sprocket 30, i.e., the phases of tooth parts in terms of rotation about the axis X, are shifted by a prescribed amount so that the chain roller 71 (FIGS. 6 and 7) which begins to engage with the first sprocket 20 in the chain section 7 that is shifted from the second sprocket 30 to the first sprocket 20 during a speed change is positioned in a central region, i.e., the tooth valley part 23, located between the tooth part 22a and tooth part 22b of the first sprocket 20. The chain roller 72 which begins to leave the second sprocket wheel 30 is positioned in a central region located between the tooth parts 32a and 32b of the second sprocket 30, i.e., in the tooth valley part 33. In other words, the distance along the shifting chain 7 from the central region between the tooth part 32a and tooth part 32b of the second sprocket 30 to the central region between the tooth part 22a and tooth part 22b of the first sprocket 20 is substantially an integral multiple of the chain pitch. As a result, the shifting of the chain 7 during a speed change is smooth. If desired, the shape of tooth 22a or teeth adjacent to tooth 22a may be shaped (e.g., by tilting in the direction of chain travel, narrowing, thinning, shortening, chamfering, etc.) to further enhance the chain shifting operation.

Figure 6:
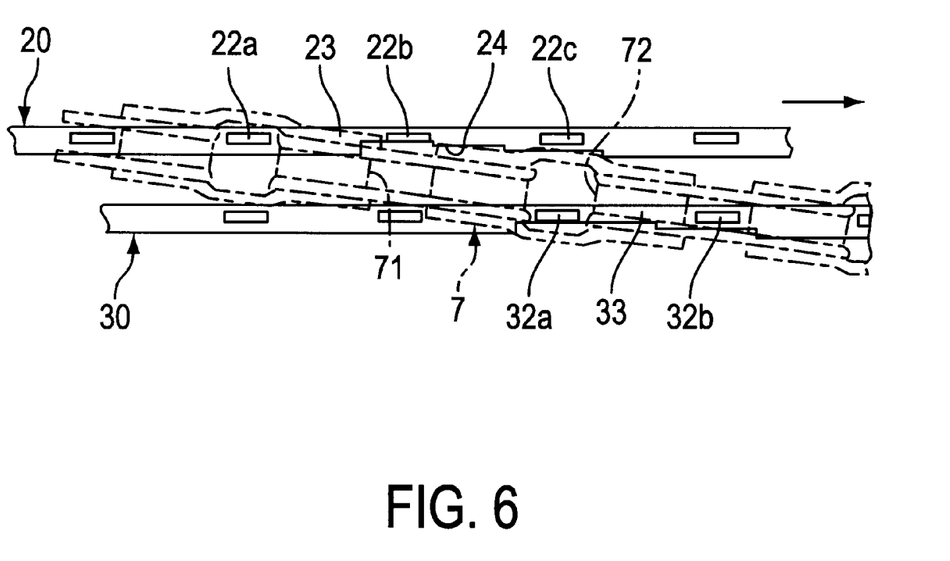
FIG. 6 is a top view illustrating shifting of a chain from one sprocket to another.
Figure 7:
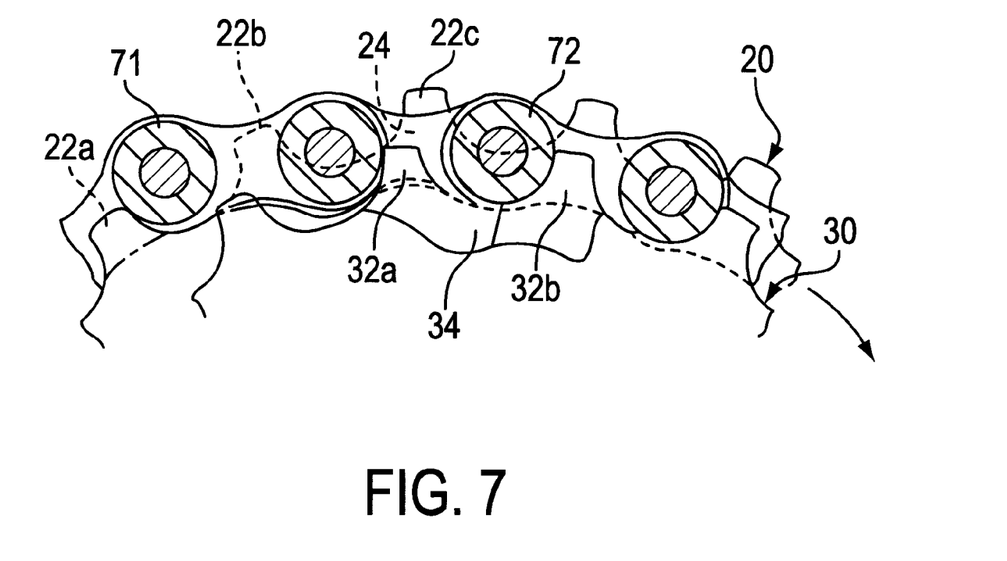
FIG. 7 is a side view illustrating shifting of a chain from one sprocket to another.

Furthermore, a recess 24 which receives at least some of the chain plates of the shifting chain section 7 is formed in the side surface of the first sprocket 20 facing the second sprocket 30. As a result, the shifting chain section 7 can approach the first sprocket 20 more closely, so that the engagement between the shifting chain section 7 and the first sprocket 20 becomes even smoother. This recess 24 extends to the tooth part 22b located forward (with respect to the direction of rotation of the sprockets indicated by the arrow) of the tooth part 22a where the shifting chain section 7 begins to engage, and extends further to the side wall of the tooth part 22c located even further forward, and to a point beneath the side wall, so that at least some of the chain plates of the shifting chain section 7 can be received. In FIG. 6, outer plates of the chain section 7 are positioned at the tooth part 22a. Consequently, the tooth part 22a enters the space between these outer plates. In cases where inner plates of the chain section 7 are positioned at the tooth part 22a, the positional relationship is such that the tooth part 22a contacts the outer surface of one of the inner plates. With both of these positional relationships being included, the tooth part 22a is viewed as the tooth part where the shifting chain section 7 begins to engage, and the tooth valley part 23 located between this tooth part 22a and the tooth part 22b is used as a reference for the phase relationship of the first sprocket 20 and second sprocket 30.

While only the first sprocket subassembly 1 has been described, the second sprocket subassembly 2 is also assembled in a similar positional relationship. Moreover, this relationship is maintained between the first sprocket subassembly 1 and second sprocket subassembly 2, and between all of the sprockets including the sprockets 3a, 3b and 3c. Accordingly, not only is a recess 34 also formed in the second sprocket 30, but recesses are formed in all of the sprockets except for the sprocket with the smallest diameter. However, a system in which a recess is also formed in the sprocket with the smallest diameter so that all of the parts are of a common type could also be used.

Figure 4:
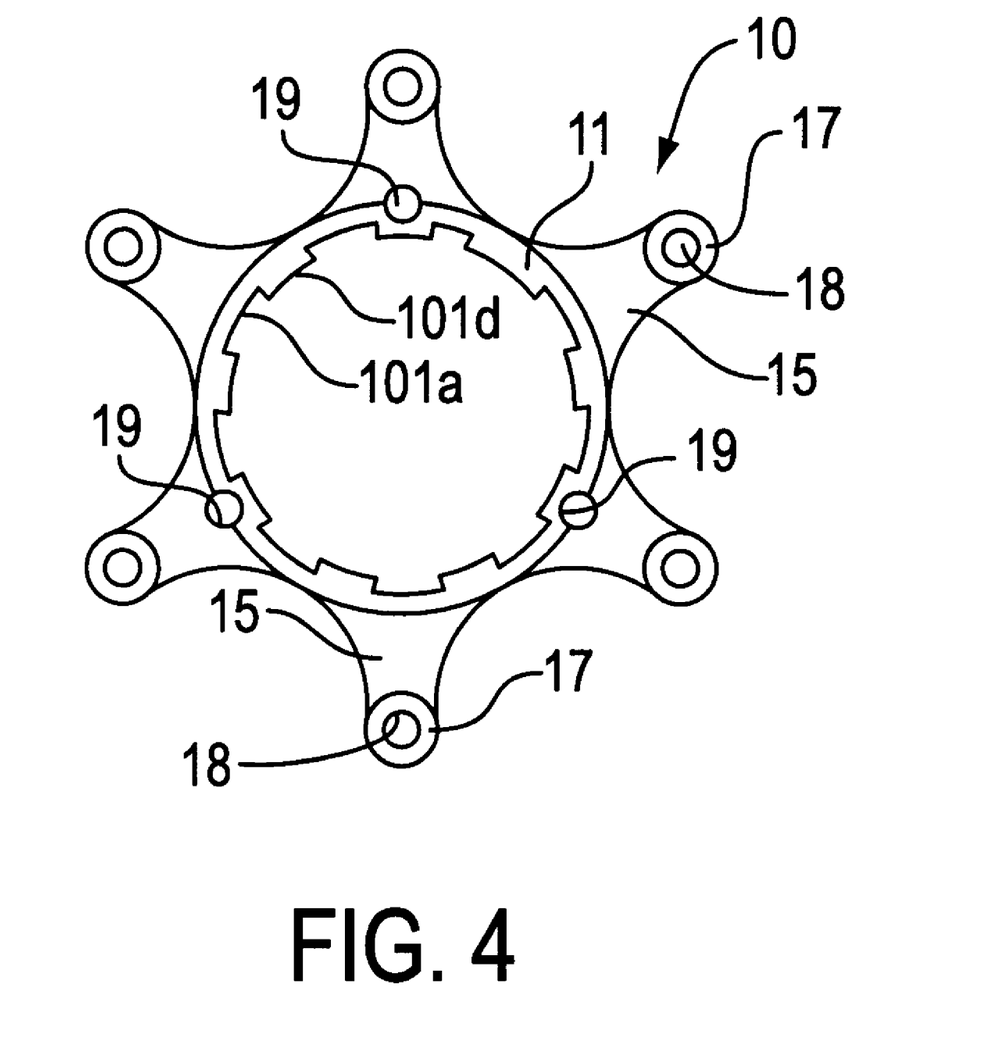
FIG. 4 is a front view of a particular embodiment of a sprocket support according to the present invention.
Figure 5:
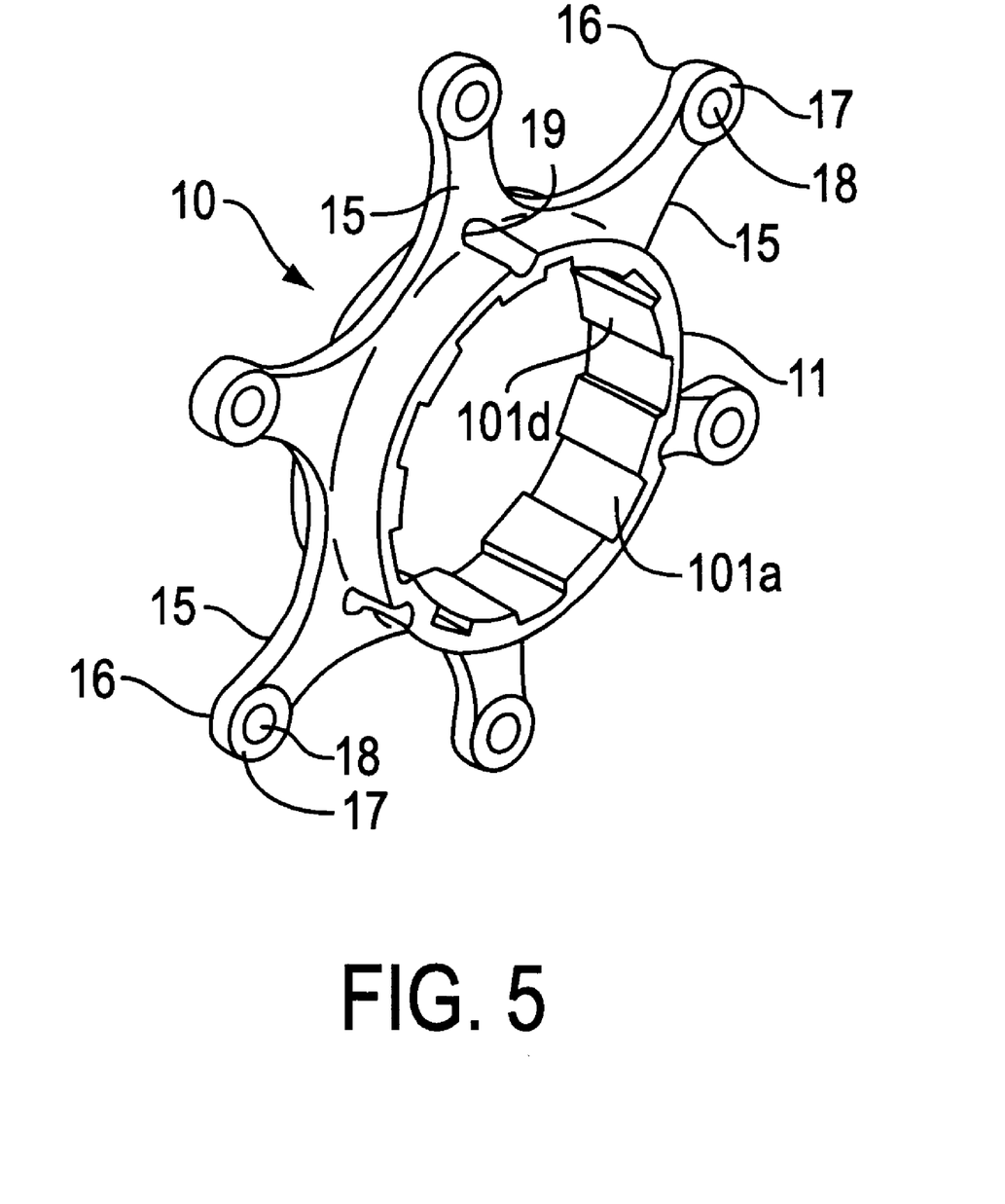
FIG. 5 is a perspective view of the sprocket support shown in FIG. 4.

As shown in FIG. 4, engaging grooves 101a and engaging projections or splines 101d which extend in the axial direction are formed in the inner circumferential surface of the boss part 11 of the spider 10. Furthermore, holes 19 through which the connecting screws 5 are passed are formed in the boundary region between the supporting arms 5 and the boss part, in a plurality of positions which are equally spaced in the circumferential direction.

The boss part 11 has a front end surface 12 and a rear end surface 13 which extend in a radial direction with respect to the axis X. As shown in FIG. 1, the distance between end surfaces 12 and 13, i.e., the length of the boss part 10 in the direction of the axis X, is set so that the final assembly spacing in the direction of the axis X of the adjacent sprockets mounted on the respective sprocket subassemblies is obtained by causing the rear end surface 13 of the first sprocket subassembly 1 to contact the front end surface 12 of the second sprocket subassembly 2.

The preceding description has been a description of the first sprocket subassembly 1, but the second sprocket subassembly 2 has a similar configuration. Sprocket subassembly 2 differs from the first sprocket subassembly 1 in that the respective numbers of teeth of the mounted sprocket wheels are 17 teeth and 16 teeth, and in that the lengths of the arm parts of the spider are correspondingly shorter. Otherwise, this second sprocket subassembly 2 is substantially the same as the first sprocket subassembly 1. Engaging grooves 101a and engaging projections of splines 101d which extend in the axial direction are formed in the inner circumferential surface of the boss part, and holes through which the connecting screws 5 are passed are also formed. Accordingly, further description of the second sprocket subassembly 2 will be omitted.

Figure 8:
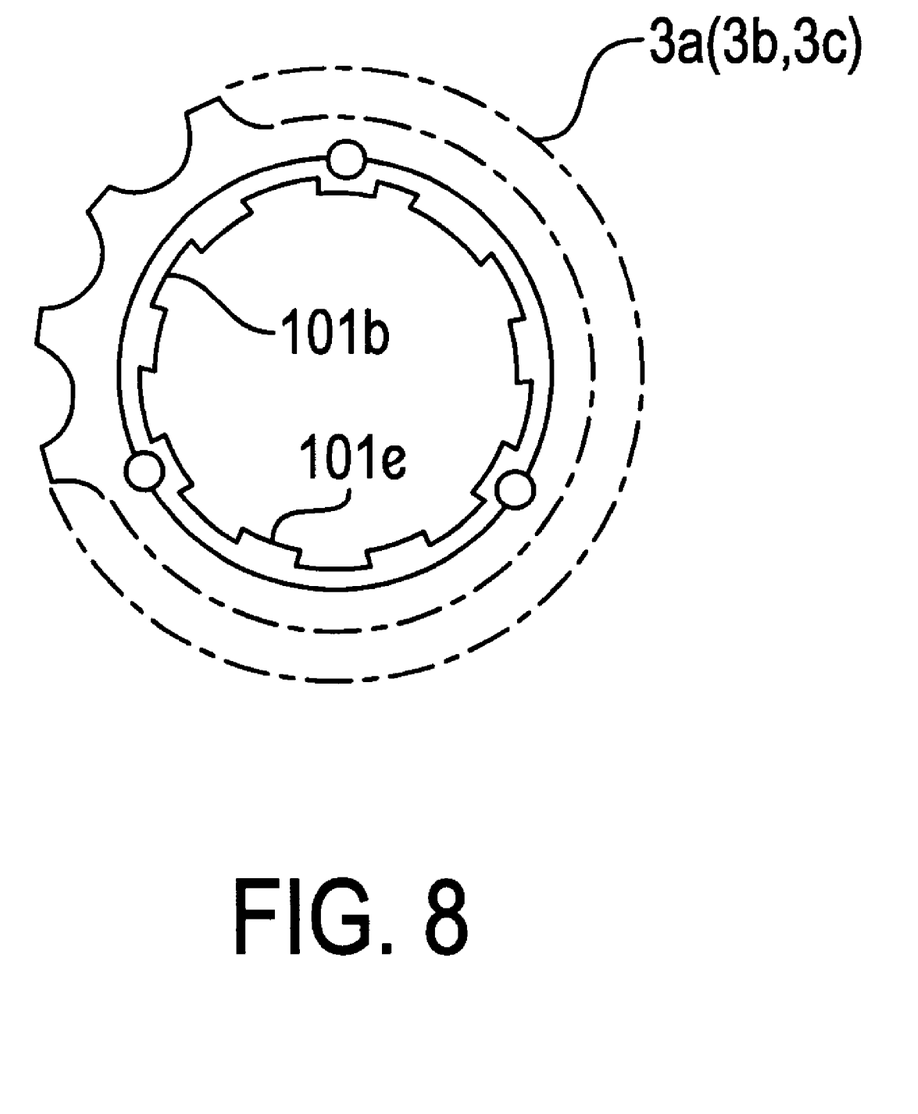
FIG. 8 is a front view of a ring-shaped sprocket shown in FIG. 4.

FIG. 8 shows the first, second and third annular plate-shaped sprocket wheels 3a, 3b and 3c. In this embodiment, the respective numbers of teeth of these sprocket wheels are 15 teeth, 14 teeth and 13 teeth. Engaging grooves 101b and engaging projections or splines 101e which extend in the axial direction are formed on the inner circumferential surfaces of the sprockets, and holes through which the connecting screws 5 are passed are similarly formed near the inner circumferential surfaces.

Figure 9:
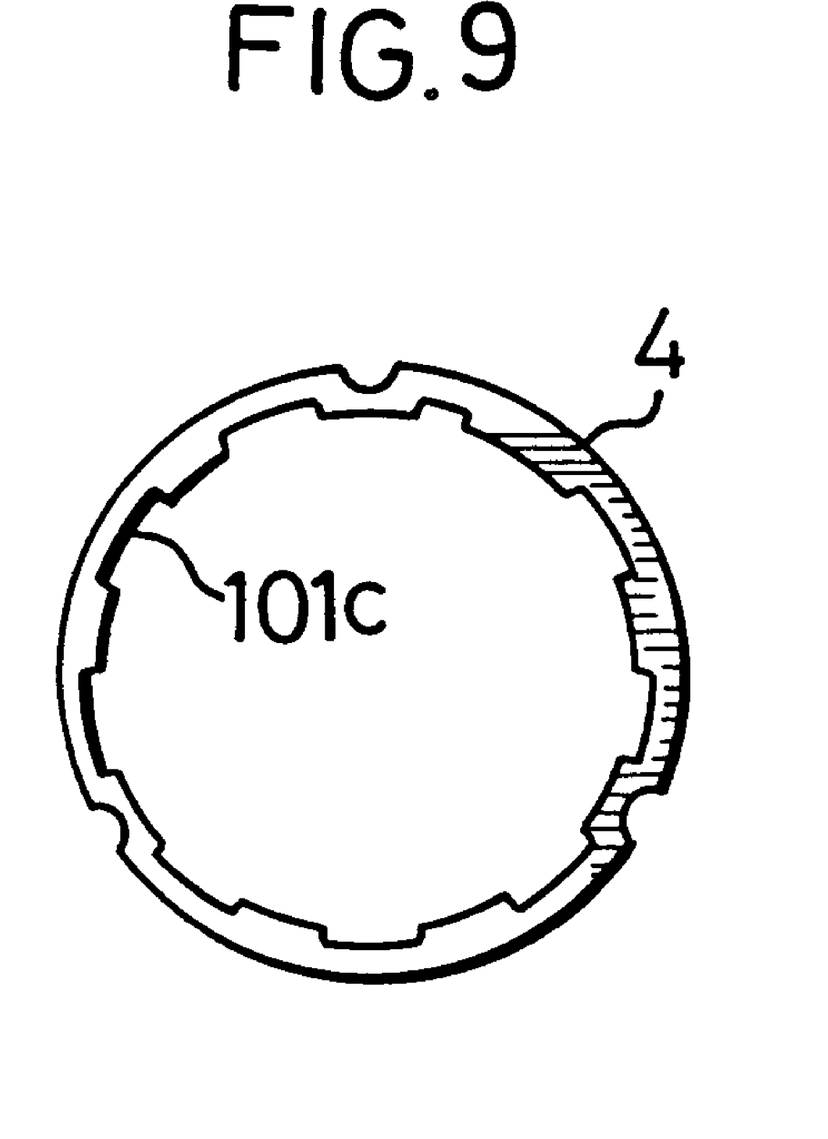
FIG. 9 is a front view of a spacer shown in FIG. 4.

FIG. 9 illustrates one of the ring-shaped spacers 4. Engaging grooves 101c and engaging projections or splines 101f which extend in the axial direction are formed in the inner circumferential surface of this ring-shaped spacer 4, and recesses through which the connecting screws 5 are passed are formed in the outer circumferential surface of the spacer. The thickness of each ring-shaped spacer 4 is set so that the final assembly spacing of the adjacent sprocket wheels in the direction of the axis X is obtained.

As is shown in FIG. 1, when the first sprocket subassembly 1, the second sprocket subassembly 2, the first, second and third sprockets 3a, 3b and 3c and spacers 4 are formed into an integral unit by means of the connecting screws 5, the engaging grooves 101a, 101b and 101c and engaging projections 101d, 101e and 101f formed in the inner circumferential surfaces of the respective components constitute an overall set of engaging grooves, and projections i.e., an engaging means 101, which engages with the engaging recesses 92d formed in the free hub 90.

While the above is a description of various embodiments of the present invention, further modifications may be employed without departing from the spirit and scope of the present invention. For example, in regard to the respective numbers of teeth of the sprockets mounted in the sprocket subassemblies, various combinations of numbers of teeth (differing by only a few teeth) other than the combination of 21 teeth and 19 teeth, or the combination of 18 teeth and 17 teeth, may be used. Combinations of sprocket subassemblies and individual sprockets may be arbitrarily selected, or the multiple sprocket assembly may be constructed using only sprocket subassemblies. It would also be possible to form the outer race of the one-way clutch mechanism 92 itself on the inner circumferential surfaces of the wheels instead of the engaging means 101. Although steel was used as the material of the sprockets and an aluminum alloy was used as the material of the spider, it would also be possible to use special alloys, sintered alloys or artificial materials instead. Fastening rivets 6 may me replaced by bolts and nuts, projections which extend from the supporting arms 15, etc.

Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A rear wheel multiple sprocket assembly for a bicycle comprising:
   a sprocket support (10) including:
      a boss (11);
      a plurality of supporting arms (15) extending radially outward from the boss (11);
      wherein each supporting arm (15) includes a first mounting surface (16) and a second mounting surface (17) opposite the first mounting surface (16) in an end region of the supporting arm (15);
   a first sprocket (20) mounted to the first mounting surface (16) of each supporting arm;
   a second sprocket (30) mounted to the second mounting surface (17) of each supporting arm;
   wherein a difference between a number of teeth on the first sprocket (20) and a number of teeth on the second sprocket (30) is from one to three teeth; and
   wherein the boss (11) includes an engaging means (101a, 101d) disposed on an inner peripheral surface thereof for nonrotatably engaging with a one-way clutch mechanism (92).

2. The multiple sprocket assembly according to claim 1 wherein the first sprocket (20) and second sprocket (30) are fastened to the respective first mounting surface (16) and second mounting surface (17) so that a chain roller (71) that begins to engage with the first sprocket (20) when a chain (7) shifts from the second sprocket (30) to the first sprocket (20) is positioned in a central region (23) between adjacent teeth (22a,22b) of the first sprocket (20).

3. The multiple sprocket assembly according to claim 2 wherein a recess (24) is formed on a side surface of the first sprocket (20) facing the second sprocket (30) for receiving at least a portion of chain plates of a chain section that shifts from the second sprocket (30) to the first sprocket (20).

4. The multiple sprocket assembly according to claim 3 wherein a recess (34) is formed on a side surface of the second sprocket (30) facing away from the first sprocket (20) for receiving at least a portion of chain plates of a chain section that shifts from a third sprocket to the second sprocket (30), wherein the third sprocket has fewer teeth than the second sprocket.

5. The multiple sprocket assembly according to claim 1 further comprising fastening means (6) for fastening the first sprocket (20) and the second sprocket (30) to the respective first mounting surface (16) and second mounting surface (17).

6. The multiple sprocket assembly according to claim 5 wherein the fastening means (6) comprises an attachment pin which extends through a first sprocket opening (21) in the first sprocket (20), a second sprocket opening (31) in the second sprocket (30), and an attachment opening (18) in a corresponding supporting arm (115).

7. The multiple sprocket assembly according to claim 1 wherein the sprocket support (10) is formed from a material having a specific gravity less than the first sprocket (20) and the second sprocket (30).

8. The multiple sprocket assembly according to claim 7 wherein the sprocket support (10) is formed from an aluminum alloy, and wherein the first sprocket (20) and the second sprocket (30) are formed from steel.

9. The multiple sprocket assembly according to claim 1 wherein the boss (11) is concentric with an axis (X), and wherein the boss (11) includes:
- a front portion which extends away from the plurality of supporting arms (15) in the direction of the axis (X) and terminates with a front end surface (12); and
- a rear portion which extends away from the plurality of supporting arms (15) in the direction of the axis (X) opposite the front portion and terminates with a rear end surface (13).

10. The multiple sprocket assembly according to claim 1 wherein the engaging means (101a, 101d) comprises a plurality of engaging grooves (101a) alternating with a plurality of engaging projections (101d) formed on an inner peripheral surface of the boss (11).

11. A multiple sprocket assembly for a bicycle comprising:
- a sprocket support (10) including:
  - a boss (11) including a first engaging means (101a, 101d) disposed on an inner peripheral surface thereof for engaging with a one-way clutch mechanism (92);
  - a plurality of supporting arms (15) extending radially outward from the boss (11);
  - wherein each supporting arm (15) includes a first mounting surface (16) and a second mounting surface (17) opposite the first mounting surface (16) in an end region of the supporting arm (15):
- a first sprocket (20) mounted to the first mounting surface (16) of each supporting arm;
- a second sprocket (30) mounted to the second mounting surface (17) of each supporting arm; and
- one or more third sprockets (3a,3b,3c) disposed in a row with the first sprocket (20) and the second sprocket (30), each third sprocket (3a,3b,3c) having a second engaging means (101b,101e) disposed on an inner peripheral surface thereof for engaging with the one-way clutch mechanism (92).

12. The multiple sprocket assembly according to claim 11 wherein each third sprocket (3a,3b,3c) has an annular plate shape.

13. The multiple sprocket assembly according to claim 12 further comprising a spacer (4) disposed between adjacent third sprockets (3a,3b,3c).

14. The multiple sprocket assembly according to claim 13 further comprising a connecting screw fastening the first sprocket (20), the second sprocket (30) and at least one third sprocket (3a,3b,3c).

15. The multiple sprocket assembly according to claim 12 wherein the first engaging means (101a, 101d) and the second engaging means (101b, 101e) each comprise a plurality of splines.

16. A multiple sprocket assembly for a bicycle comprising:
- a plurality of sprocket subassemblies (1,2), each sprocket subassembly (1,2) including:
  - a sprocket support (10) including:
    - a boss (11);
    - a plurality of supporting arms (15) extending radially outward from the boss (11);
    - wherein each supporting arm (15) includes a first mounting surface (16) and a second mounting surface (17) opposite the first mounting surface (16) in an end region of the supporting arm (15);
  - a first sprocket (20) mounted to the first mounting surface (16) of each supporting arm (15);
  - a second sprocket (30) mounted to the second mounting surface (17) of each supporting arm (15); and
- wherein a first one of the plurality of sprocket subassemblies (1) is disposed in a row with a second one of the plurality of sprocket subassemblies (2).

17. The multiple sprocket assembly according to claim 16 further comprising, in each sprocket subassembly (1,2,), a fastening means (6) for fastening the first sprocket (20) and the second sprocket (30) to the respective first mounting surface (16) and second mounting surface (17).

18. The multiple sprocket assembly according to claim 17 wherein the boss (11) in each sprocket subassembly (1,2) includes a first engaging means (101a,101d) disposed on an inner peripheral surface thereof for engaging with a one-way clutch mechanism (92).

19. The multiple sprocket assembly according to claim 18 further comprising one or more annular plate-shaped third sprockets (3a,3b,3c) disposed in a row with the first sprocket subassembly (1) and the second sprocket subassembly (2), each third sprocket (3a,3b,3c) having a second engaging means (101b,101e) disposed on an inner peripheral surface thereof for engaging with the one-way clutch mechanism (92).

20. The multiple sprocket assembly according to claim 19 further comprising a spacer (4) disposed between each adjacent third sprocket (3a,3b,3c).

21. The multiple sprocket assembly according to claim 20 wherein, in each sprocket subassembly (1,2) the boss (11) is concentric with an axis (X), and wherein the boss (11) includes:
- a front portion which extends away from the plurality of supporting arms (15) in the direction of the axis (X) and terminates with a front end surface (12);
- a rear portion which extends away from the plurality of supporting arms (15) in the direction of the axis (X) opposite the front portion and terminates with a rear end surface (13);
- wherein the rear portion of the boss (11) of the first sprocket subassembly (1) is aligned with the front portion of the boss (11) of the second sprocket subassembly (2) for determining the spacing between the second sprocket (30) of the first sprocket subassembly (1) and the first sprocket (20) of the second sprocket subassembly (2).

22. The multiple sprocket assembly according to claim 21 further comprising connecting means (5) for fastening the first sprocket subassembly (1), the second sprocket subassembly (2) and each third sprocket (3a,3b,3c) together.

23. The multiple sprocket assembly according to claim 22 wherein the connecting means (5) comprises a connecting screw which passes through the first sprocket subassembly (1), the second sprocket subassembly (2) and each third sprocket (3a,3b,3c) in the direction of the axis (X).

24. The multiple sprocket assembly according to claim 23 wherein the fastening means (6) in each sprocket subassembly (1,2) comprises an attachment pin which extends through a first sprocket opening (21) in the first sprocket (20), a second sprocket opening (31) in the second sprocket (30), and an attachment opening (18) in a corresponding supporting arm (15).

25. A rear wheel multiple sprocket assembly for a bicycle comprising:
- a sprocket support (10) including a first mounting surface (16) and a second mounting surface (17) opposite the first mounting surface in a radially outward region of the sprocket support (10);

a first sprocket (20) mounted to the first mounting surface (16) of the sprocket support (10);

a second sprocket (30) mounted to the second mounting surface (17) of the sprocket support (10);

wherein a difference between a number of teeth on the first sprocket (20) and a number of teeth on the second sprocket (30) is from one to three teeth; and wherein the sprocket support (10) extends radially inwardly from the first sprocket (20) and the second sprocket (30) and has a radially inner surface defining at least one engaging groove (101a).

26. The multiple sprocket assembly according to claim 25 further comprising at least one engaging projection (101d) adjacent to the at least one engaging groove (101a).

27. The multiple sprocket assembly according to claim 25 wherein the sprocket support (10) includes a radially inwardly extending arm (15).

28. The multiple sprocket assembly according to claim 25 further comprising fastening means (6) for fastening the first sprocket (20) and the second sprocket (30) to the respective first mounting surface (16) and second mounting surface (17).

29. The multiple sprocket assembly according to claim 28 wherein the fastening means (6) comprises an attachment pin which extends through a first sprocket opening (21) in the first sprocket (20), a second sprocket opening (31) in the second sprocket (30), and an attachment opening (18) in the sprocket support (10).

30. A rear wheel multiple sprocket assembly for a bicycle comprising:

a plurality of sprocket supporting members (15), wherein each sprocket supporting member (15) includes a first mounting surface (16) and a second mounting surface (17) opposite the first mounting surface (16) in an end region of the sprocket supporting member (15);

a first sprocket (20) mounted to the first mounting surface (16) of each sprocket supporting member (15);

a second sprocket (30) mounted to the second mounting surface (17) of each sprocket supporting member (15);

wherein a difference between a number of teeth on the first sprocket (20) and a number of teeth on the second sprocket (30) is from one to three teeth;

wherein the plurality of sprocket supporting members (15) extend radially inwardly from the first sprocket (20) and the second sprocket (30); and wherein each of the plurality of sprocket supporting members (15) terminates at a radially inner surface defining at least one engaging groove (101a).

31. The multiple sprocket assembly according to claim 30 further comprising at least one engaging projection (101d) adjacent to each engaging groove (101a).

32. The multiple sprocket assembly according to claim 30 wherein the plurality of sprocket supporting members (15) include a plurality of radially inwardly extending arms.

33. The multiple sprocket assembly according to claim 32 wherein a space is defined between each of the plurality of radially inwardly extending arms in the circumferential direction.

34. The multiple sprocket assembly according to claim 30 further comprising fastening means (6) for fastening the first sprocket (20) and the second sprocket (30) to the respective first mounting surface (16) and second mounting surface (17) of each sprocket supporting member (15).

35. The multiple sprocket assembly according to claim 34 wherein the fastening means (6) comprises an attachment pin which extends through a first sprocket opening (21) in the first sprocket (20), a second sprocket opening (31) in the second sprocket (30), and an attachment opening (18) in each sprocket supporting member (15).

36. A rear wheel multiple sprocket assembly for a bicycle comprising:

a plurality of elongated sprocket supporting arms (15), wherein each sprocket supporting arm (15) includes a first mounting surface (16) and a second mounting surface (17) opposite the first mounting surface (16) in an end region of the sprocket supporting arm (15);

a first sprocket (20) mounted to the first mounting surface (16) of each sprocket supporting arm (15);

a second sprocket (30) mounted to the second mounting surface (17) of each sprocket supporting arm (15);

wherein a difference between a number of teeth on the first sprocket (20) and a number of teeth on the second sprocket (30) is from one to three teeth;

wherein the plurality of sprocket supporting arms (15) extend radially inwardly from the first sprocket (20) and the second sprocket (30); and wherein each of the plurality of sprocket supporting arms (15) terminates at a radially inner surface defining at least one engaging groove (101a).

37. The multiple sprocket assembly according to claim 36 further comprising at least one engaging projection (101d) adjacent to each engaging groove (101a).

38. The multiple sprocket assembly according to claim 36 wherein a space is defined between each of the plurality of sprocket supporting arms (15) in the circumferential direction.

39. The multiple sprocket assembly according to claim 36 further comprising fastening means (6) for fastening the first sprocket (20) and the second sprocket (30) to the respective first mounting surface (16) and second mounting surface (17) of each sprocket supporting arm (15).

40. The multiple sprocket assembly according to claim 39 wherein the fastening means (6) comprises an attachment pin which extends through a first sprocket opening (21) in the first sprocket (20), a second sprocket opening (31) in the second sprocket (30), and an attachment opening (18) in each sprocket supporting arm (15).

41. A rear wheel multiple sprocket assembly for a bicycle comprising:

a sprocket support (10) defining a plurality of attachment holes (18) at radially outward locations and a plurality of radially inwardly facing splines at radially inward locations;

a first sprocket (20) having a plurality of first sprocket openings (21) aligned with the plurality of attachment holes (18) on one side of the plurality of attachment holes (18);

a second sprocket (30) having a plurality of second sprocket openings (31) aligned with the plurality of attachment holes (18) on an opposite side of the plurality of attachment holes (18);

a fastener extending through each first sprocket opening (21), each attachment hole (18) and each second sprocket opening (31) for mounting the first sprocket (20) and the second sprocket (30) to the sprocket support (10);

wherein the sprocket support (10) is sandwiched between the first sprocket (20) and the second sprocket (30) at the plurality of attachment holes (18); and wherein a difference between a number of teeth on the first sprocket (20) and a number of teeth on the second sprocket (30) is from one to three teeth.

* * * * *